Aug. 30, 1960 B. I. ULINSKI 2,950,773
GEAR DRIVE STEERING AND TRACTION UNIT
Filed Feb. 1, 1956 3 Sheets-Sheet 1

INVENTOR.
B. I. Ulinski,
BY
A. H. Golden
ATTORNEY

Aug. 30, 1960 B. I. ULINSKI 2,950,773
GEAR DRIVE STEERING AND TRACTION UNIT
Filed Feb. 1, 1956 3 Sheets-Sheet 2

INVENTOR.
B. I. Ulinski
BY A. H. Golden
ATTORNEY

Aug. 30, 1960 B. I. ULINSKI 2,950,773
GEAR DRIVE STEERING AND TRACTION UNIT
Filed Feb. 1, 1956 3 Sheets-Sheet 3

INVENTOR.
B. I. Ulinski
BY
ATTORNEY

United States Patent Office 2,950,773
Patented Aug. 30, 1960

2,950,773

GEAR DRIVE STEERING AND TRACTION UNIT

Bronislaus I. Ulinski, Chicago, Ill., assignor to The Yale & Towne Manufacturing Company, Stamford, Conn., a corporation of Connecticut Filed Feb. 1, 1956, Ser. No. 562,710

5 Claims. (Cl. 180—13)

This invention relates to an industrial truck of the type having a steering and traction unit that is adapted for rotation relatively to the main frame of the truck in order to impart directional movement to the truck. In combinations of the particular class, it is customary to utilize a motor and a traction wheel, together with gears through which the motor drives the wheel. Generally, the unit is equipped with a brake that acts on the wheel through the gears. The entire unit comprising the parts set forth is adapted for steering rotation on a circular bearing relatively to the frame of the truck.

Those persons skilled in the art will appreciate that the gears in a steering and traction unit of this type extend between the upper and lower parts of the unit. The gears therefore extend through an opening in that part of the unit that lies within the diameter of the circular bearing on which the unit is steered. While extending through this opening, the gears naturally must be so arranged as not to interfere with the positioning of the wheel on the lower part of the unit. Also, the unit must rigidly support the wheel, and must have some provision for lubricating the gears. All of these things complicate the construction of a steering and traction unit of the particular type and make difficult the designing of the unit, particularly since the gears are so arranged as to effect a speed reduction between the motor and wheel. I have conceived by my invention an extremely novel construction that enables me to meet very well the requirements of a steering and traction unit of the class described and that has very considerable advantages over the units of the prior art.

As an important feature of my invention, I employ on my steering and traction unit a motor that is mounted with its operating shaft in a vertical position, the motor then transmitting its power through a pinion to a series of meshing vertically aligned gears, the lowermost of which is mounted in driving relation to the traction wheel. Of course, it will be appreciated that the pinion may very well be utilized with a motor positioned horizontally. However, as a preferred feature of my invention, the motor pinion operates a bevel gear to obtain a large gear reduction, the bevel gear being mounted integrally on the shaft to which is secured the uppermost gear or pinion of the series of vertically aligned gears.

Those skilled in the art will appreciate that because I utilize a series of vertically aligned gears, I make possible the movement of lubricating material to the various bearings on the unit. More in detail, I utilize on the lower part of the steering and traction unit an oil reservoir in which the lowermost of the series of vertically aligned gears rotates. Each gear will then act in turn to feed oil from the lower toward the upper end of the unit, with the oil then moving to the bearings. As a particular part of this feature of my invention I so construct the casing of the unit that the gears will feed the oil to the circular bearing on which the steering and traction unit is steered, and also to a bearing for brake operating means on the casing.

As a still further feature of my invention, the vertically aligned arrangement of the gears enables me to form the casing of my steering and traction unit with an extremely small vertical opening for those gears. This vertical opening by its small size makes possible a very rigid gear casing assembly. This in turn makes possible the utilization of a drive axle that is rigidly mounted at one side on the casing and that carries the steering and traction wheel on the other side thereof in "outrigger" fashion. I fully appreciate the fact that it is old in the art to employ vertically positioned gears, but so far as I know, no industrial truck of the prior art has been developed that utilizes a series of gears that are mounted all in vertically aligned relation to one another in an assembly of the class described, making it possible to achieve the very considerable advantages of my invention.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings.

Figure 1:
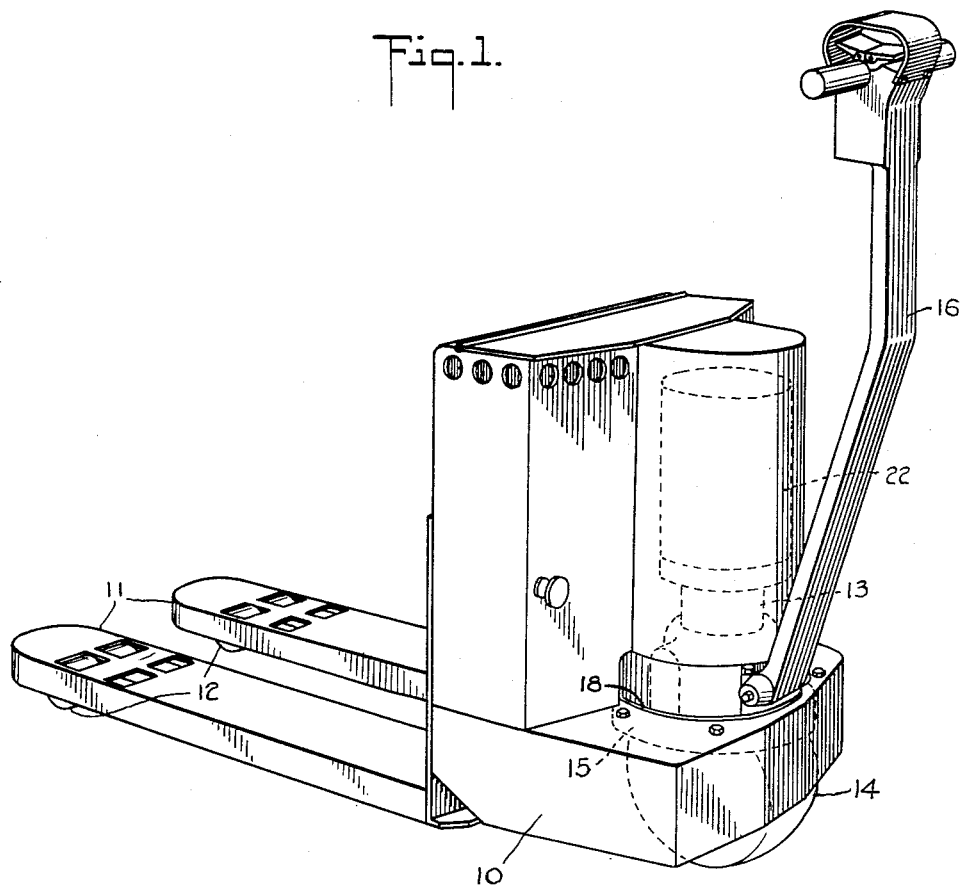
Fig. 1 shows an industrial truck on which I utilize my novel steering and traction unit construction.

In order that my invention may readily be understood, I show in Fig. 1 a motorized industrial truck like that shown in my earlier application, Serial No. 543,658, now Patent No. 2,842,216, with a main frame 10 and a rearwardly extending load platform 11. Load wheels 12 support the rear end of the truck, and a steering and traction unit 13 is mounted on the main frame 10 for supporting the front end of the truck. It will be appreciated that the steering and traction unit 13 has a ground engaging traction wheel 14, and rotates relatively to the main frame 10 on a circular ball bearing assembly 15, shown in Fig. 2, whereby to steer the truck. The unit 13 has also a pivoted handle 16 through which it is steered, as is usual in trucks of the particular class. The further details of the truck are not important to an understanding of the invention that I claim in this application, and it is necessary here to know merely that the steering and traction unit 13 is mounted for steering rotation on a circular bearing that is secured about the unit.

Figure 2:
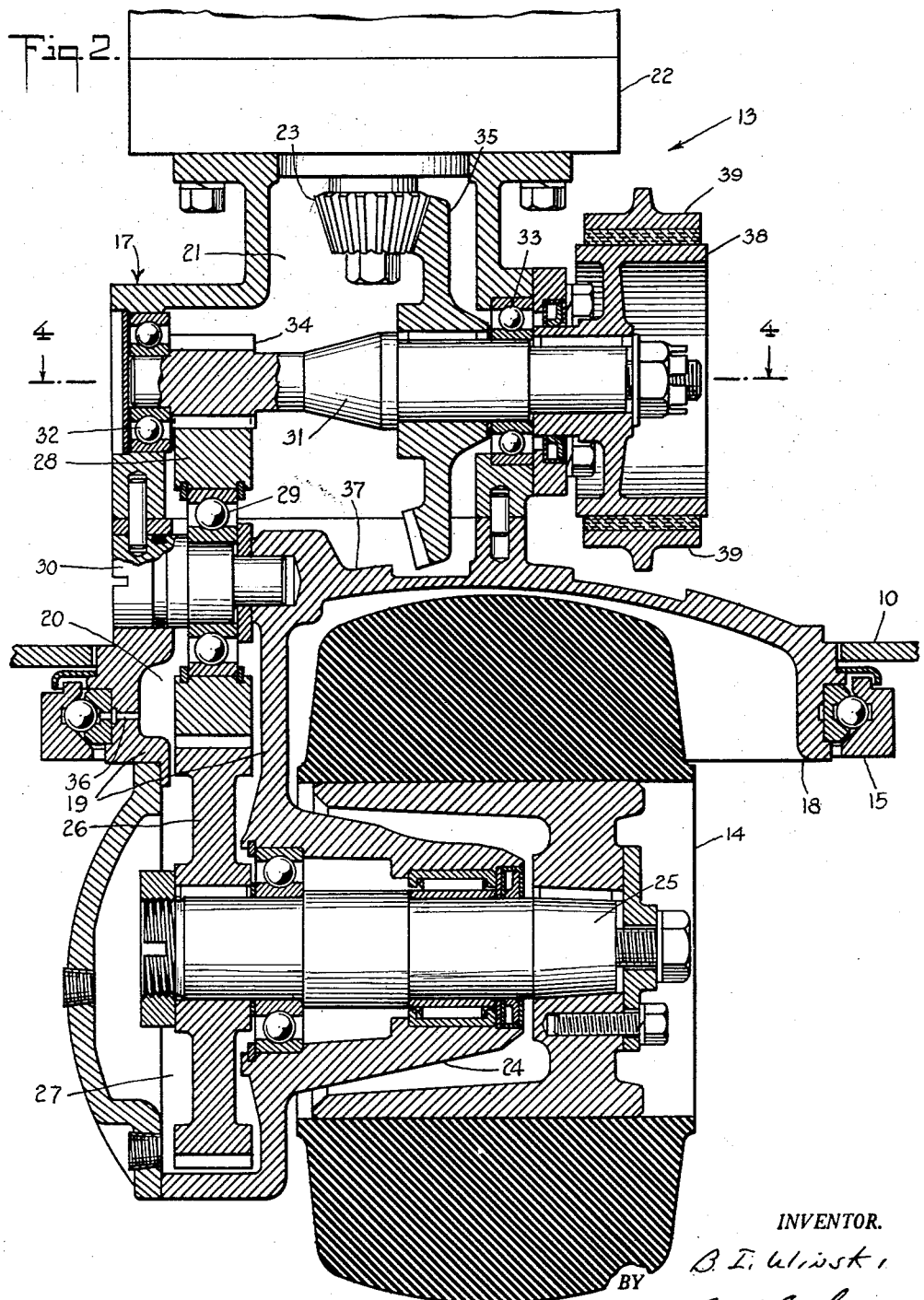
Fig. 2 shows my novel gear drive in vertical section.

In my invention, I utilize as the main portion of the steering and traction unit 13 a gear casing 17, well shown in Fig. 2, that has on its periphery a circular part 18 through which the unit is supported on the bearing assembly 15. The casing 17 has also a portion 19 that extends vertically within the diameter of the circular part 18 between the upper and lower parts of the casing, with a vertical gear opening 20 formed in the portion 19. I form the upper part of the casing 17 with a gear chamber 21 that is in communication with the opening 20, and on this chamber 21 I mount a traction motor 22 having a drive pinion 23 that is positioned in the chamber.

The lower part of gear casing 17 naturally supports the traction wheel 14, and for the particular purpose I prefer to utilize an arrangement like the one that I show in my application entitled Steering and Traction Unit Construction, filed December 23, 1955, Serial No. 555,064. Thus, I form the lower part of casing 17 at one side of traction unit 13 with an axle mounting portion 24. An axle 25 is mounted at one end to rotate on the portion 24, and has the wheel 14 keyed to its opposed end. I do not wish to be limited to this particular mounting for the traction wheel 14, since it is conceivable that the wheel can be mounted in other ways. However, to reach a full understanding of my invention, it is important to realize that the lower part of the casing, and therefore the traction wheel 14, will be supported through the vertical casing portion 19 that extends within the diameter of bearing assembly 15. It is necessary to appreciate also that the gears that drive traction wheel 14 will extend through the vertical opening 20 in that vertical casing portion 19, all as shown in Fig. 2.

In the extremely novel gear drive that I have conceived, I utilize a drive gear 26, Fig. 2, that rotates integrally with the traction wheel 14, this gear 26 in the arrangement shown being keyed to the opposed end of axle 25. It will be seen in Fig. 2 that drive gear 26 is in vertically aligned relation to the gear opening 20, and also that this gear rotates in a reservoir 27 that I form for lubricating material on the lower part of the gear casing 17. I utilize also an idler gear 28 that rotates in the casing opening 20 in meshing relation to the drive gear 26, this idler gear 28 being mounted on the casing through a bearing 29 on a shaft 30. In a transverse position in chamber 21 of the casing I mount a shaft 31 to rotate on bearings 32, 33 on the casing, with a pinion 34 on the shaft in meshing relation to idler gear 28. Keyed to shaft 31 is a bevel gear 35 meshing with the drive pinion 23 on traction motor 22.

It will be obvious that through the arrangement I have thus far described the motor 22 will drive the traction wheel 14 with a considerable gear reduction between the motor and wheel. It is even more important to realize that motor 22 will do this through the series of gears 26, 28, 34, that extend in vertically aligned relation to one another. Because the gears are aligned in that way, it will be appreciated that those gears can extend between the upper and lower parts of the casing while requiring a very small vertical opening in the casing. Therefore, it is possible to make the gear opening 20 quite small so that it will account for a very small part of the space lying within the diameter of the circular bearing assembly 15 on which the traction unit rotates. The value of this particular feature will be better appreciated when it is remembered that the vertically extending part 19 of the casing supports the lower portion of the casing and the wheel 14, and therefore must be so constructed as to be rigid. Because I can make the vertical gear opening 20 small, I am able to make the casing part 19 very rigid even though that part is quite narrow. This naturally enables the steering and traction unit to be more effectively constructed with an outrigger wheel arrangement, as will be understood when considering Fig. 2 of the drawings. This feature in itself is rather important and represents a very considerable contribution to the industrial truck art. Nevertheless, my novel gear drive does make possible a further contribution that is of extreme importance since it enables me to effect automatic lubrication of the gears and bearings on the steering and traction unit 13.

To understand the automatic lubricating action of my novel gear drive, it is necessary to observe first that the gears 26, 28, 34 by their vertically aligned relation to one another will act in turn to feel oil upwardly from the oil reservoir 27 toward the upper part of gear casing 17. Thus, the lowermost gear 26, that rotates in the oil reservoir 27, will carry oil to idler 28. Idler 28 will then transfer a part of that oil to the uppermost gear or pinion 34. As oil is fed upwardly by the gears, some of the oil naturally will move to the surface of the casing opening 20. Between that opening 20 and the bearing assembly 15 on which the steering and traction unit is steered, I form the peripheral part 18 of the gear casing with a passage 36. Since I prefer to use a separate inner race for the bearing assembly 15, as is well shown in Fig. 2, I form the passage 36 to extend also through that race. Thus, a certain amount of oil that moves into the gear opening 20 will move through passage 36 to the bearing assembly 15 on which the steering and traction unit 13 is steered.

In addition, some of the oil that is fed upwardly by the vertically aligned gears 26, 28, 34 will move into the chamber 21 on the upper part of casing 17, and will move on the lower surface 37 of chamber 21 to the bevel gear 35 whereby to lubricate that gear, and through that gear the motor pinion 23. In fact, by rotating with transverse shaft 31, the bevel gear 35 and pinion 34 on that shaft will cause oil to move generally to the surfaces of chamber 21, thus lubricating the shaft bearings 32, 33 and the idler gear bearing 29 as well.

Figure 3:
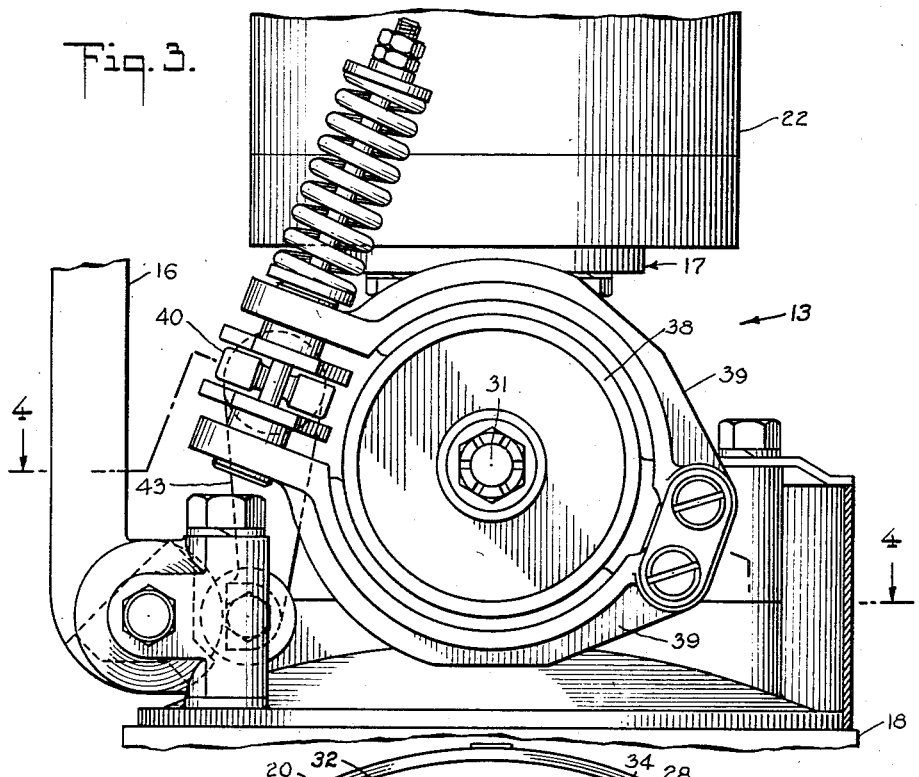
Fig. 3 is a side view showing an upper part of the steering and traction unit.
Figure 4:
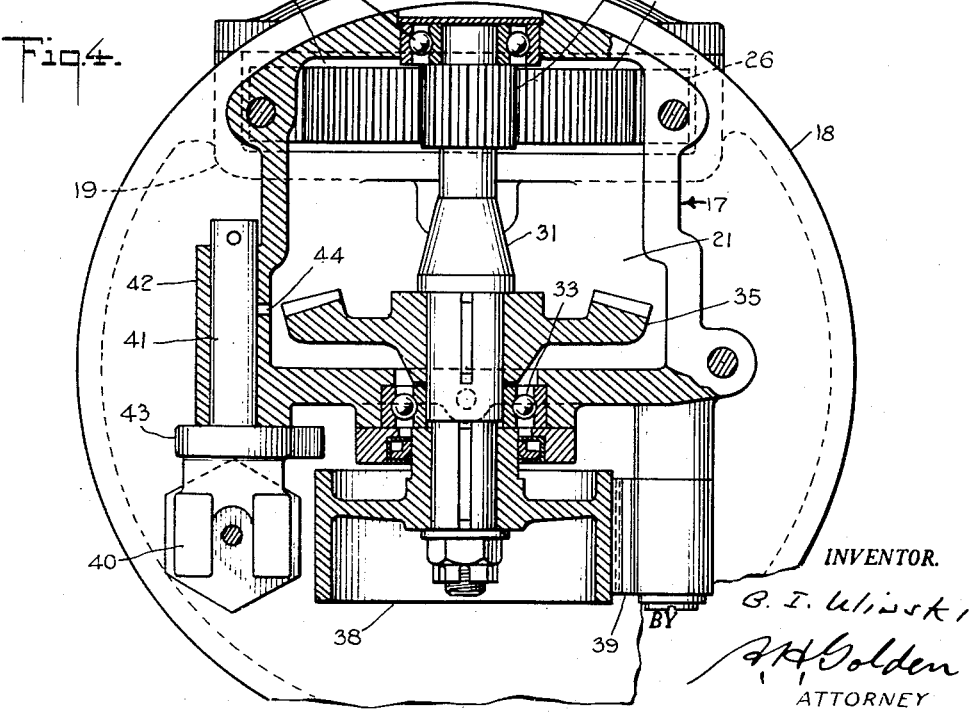
Fig. 4 is a section on the lines 4—4 in Figs. 2 and 3.

I utilize the oil that is fed to chamber 21 still further for lubricating the brake mechanism on the steering and traction unit. I shall describe the construction of the brake mechanism rather briefly since its details are not important to a understanding of my invention, and will observe merely that I utilize a brake drum 38, Figs. 2, 3, and 4, that is keyed to a portion of transverse shaft 31 that extends outwardly from the gear casing 17. Coacting with this brake drum 38 are brake shoes 39 that are controlled through a cam 40, Figs. 3 and 4, on a shaft 41 that rotates on a bearing 42 formed on the casing. The brake control shaft 41 is actuated from steering handle 16 through a lever 43, and naturally will have rather frequent movements on its bearing when the truck is in use. In my invention, I form the upper part of gear casing 17 with an oil pasage 44, well shown in Fig. 4, extending between gear chamber 21 and the bearing 42 of brake control shaft 41. A sufficient part of the oil that is fed to chamber 21 will move through passage 44 to lubricate the bearing 42, so that the brake control shaft will automatically be lubricated through the operation of the steering and traction unit 13.

It will thus be seen that my extremely novel construction enables me to lubricate not only the gears and their bearings, but also to lubricate further bearings on the steering and traction unit. Moreover, through the utilization of a series of gears that are vertically aligned, I am able to make the lubrication automatic, and to do this while utilizing simply one oil reservoir on the lower part of the unit. Furthermore, my invention enables me to make the casing of the steering and traction unit extremely rigid, since the gears by their aligned relation require merely a small vertical opening in the casing. Thereby I can rigidly support the traction wheel even when that support is effected merely through a narrow part of the gear casing. This in turn makes possible a much more effective outrigger wheel mounting. I believe, therefore, that those persons skilled in the art will understand the extremely novel contribution that I have made in a steering and traction unit of the particular class, and will appreciate fully the very considerable value of my invention.

I now claim:

1. In a truck of the class described having a main frame, a steering and traction unit comprising a gear casing, a bearing secured about the outer surface of the gear casing intermediate the upper and lower parts thereof to support the steering and traction unit for steering rotation relatively to the truck frame, a traction wheel mounted to rotate on said lower part of the casing with a portion of said wheel extending within the diameter of said bearing, a narrow section of said gear casing extending vertically at one side of the wheel within the diameter of said bearing to support the lower casing part and wheel relatively to the upper casing part and the bearing, a vertical gear opening formed in said narrow casing section, a series of meshing gears in driving relation to said traction wheel and extending through said opening between the upper and lower casing parts, means mounting said gears in vertically aligned relation to one another so that said vertical gear opening can be made small to enable the narrow casing section to be relatively rigid, the lower part of said gear casing formed with an oil reservoir in which one of the gears rotates whereby each gear will act in turn to move oil toward the upper part of the casing, said casing formed with a passage through which oil moved upwardly by said gears will flow to the bearing on which the steering and traction unit rotates, a motor mounted on said upper casing part and means through which said motor rotates said vertical series of gears to drive the traction wheel.

2. In a truck of the class described having a main frame, a steering and traction unit comprising a motor, a steering and traction wheel, a ball bearing secured about the outer surface of the steering and traction unit in position encircling a portion of said wheel and supporting said unit for steering rotation on the main frame, a narrow section of said unit extending vertically at one side of the wheel within the diameter of said bearing, a series of meshing gears mounted in vertically aligned relation to one another and arranged in an opening in said narrow section to extend between the motor and the steering and traction wheel, an oil reservoir into which the lowermost of said gears in vertical alignment is substantially immersed whereby oil is fed by said gear upwardly through the train of gears, and said steering and traction unit formed with a passage through which oil moved upwardly by said gears is fed to said bearing to lubricate said bearing.

3. In a truck of the class described having a main frame, a steering and traction unit comprising a motor, a steering and traction wheel, a bearing secured about the outer surface of the steering and traction unit in position encircling a portion of said wheel and supporting said unit for steering rotation on the main frame, a narrow section of said unit extending vertically at one side of the wheel within the diameter of said bearing, a series of meshing gears mounted in vertically aligned relation to one another and extending through an opening in said narrow section, a bevel gear coaxial with the uppermost of said gears, a pinion driven by said motor in mesh with said bevel gear, a drive shaft mounting both said lowermost gear and the steering and traction wheel, said unit having below said narow section an oil reservoir in which the lowermost of said gears in vertical alignment is substantially immersed whereby oil is fed by said gear upwardly through the said series of gears, and a passage between the gears and said bearing whereby oil moved upwardly by said gears is fed to said bearing.

4. In a truck of the class described having a main frame, a steering and traction unit comprising a gear casing having a series of gears all of which are aligned relatively to one another in a vertical plane to extend between upper and lower parts of the casing, said gears by their vertically aligned relation in one plane making possible the use of a narrow compact vertically extending gear casing, an outrigger traction axle driven by the lowermost gear of said series of gears and extending laterally outwardly of said gear casing from a point near the lowermost portion of said gear casing, a traction wheel mounted on said outwardly extending outrigger axle, a circular bearing supporting said gear casing for steering rotation on the main frame and mounted on said casing at a level below the top of said traction wheel, said circular bearing encompassing both a portion of said wheel and said narrow vertical casing, a motor on the upper part of the gear casing, and speed reduction gears through which the motor drives an upper gear of said series of gears to drive said traction wheel.

5. In a truck of the class described having a main frame, a steering and traction unit comprising a vertical gear casing having a series of gears all of which are aligned relatively to one another in a vertical plane to extend between upper and lower parts of the casing, an intermediate section of the gear casing having a small opening through which said gears extend in their vertically aligned relation enabling the casing to be narrow and compact, an outrigger traction axle driven by the lowermost gear of said series of gears and extending laterally outwardly of said gear casing from a point near the lowermost portion of said gear casing, a traction wheel mounted on said outwardly extending outrigger axle, a circular bearing supporting said gear casing for steering rotation on the main frame and mounted on said gear casing at a level below the top of said traction wheel, said circular bearing encompassing both a portion of said wheel and said intermediate section of the vertical gear casing, a motor mounted on the upper part of the gear casing and equipped with a drive pinion, and a bevel gear meshed with said drive pinion and connected to an upper gear of said series of gears so that the motor will drive said traction wheel.

References Cited in the file of this patent

UNITED STATES PATENTS

| | | |
|---|---|---|
| 1,346,915 | Sauvage | July 20, 1920 |
| 1,606,706 | Johnston et al. | Nov. 9, 1926 |
| 1,853,738 | Markey | Apr. 12, 1932 |
| 2,399,605 | Schroeder | Apr. 30, 1946 |
| 2,592,633 | Wilson | Apr. 15, 1952 |
| 2,640,400 | Verderber | June 2, 1953 |
| 2,789,648 | Huffman | Apr. 23, 1957 |

FOREIGN PATENTS

| | | |
|---|---|---|
| 890,161 | Germany | Sept. 17, 1953 |